United States Patent
Thompson

(10) Patent No.: US 6,821,070 B1
(45) Date of Patent: Nov. 23, 2004

(54) HINGED SPLIT NUT

(76) Inventor: William J. Thompson, 2120 Mondocino, Fullerton, CA (US) 92831

(*) Notice: Subject to any disclaimer, the term of this patent is extended or adjusted under 35 U.S.C. 154(b) by 0 days.

(21) Appl. No.: 10/622,039

(22) Filed: Jul. 17, 2003

(51) Int. Cl.$^7$ ................................ F16B 37/08
(52) U.S. Cl. .................. 411/433; 411/432; 411/540
(58) Field of Search ......................... 411/432, 433, 411/437, 539, 540

(56) References Cited

U.S. PATENT DOCUMENTS

| | | | |
|---|---|---|---|
| 463,301 A | 11/1891 | Brandner | |
| 663,208 A | * 12/1900 | Wrensch | ................... 411/433 |
| 721,023 A | 2/1903 | Cosper | |
| 844,469 A | 2/1907 | Prouty | |
| 875,561 A | 12/1907 | Verna | |
| 996,133 A | 6/1911 | Peters | |
| 1,106,096 A | 8/1914 | Hunt | |
| 1,375,781 A | 4/1921 | De Long | |
| 1,432,050 A | 10/1922 | Broderick | |
| 1,722,783 A | 7/1929 | Basseches | |
| 1,879,421 A | 9/1932 | Nalle | |
| 2,153,474 A | 4/1939 | Naylor et al. | |
| 2,195,124 A | 3/1940 | Skoverski | |
| 2,244,400 A | 6/1941 | Miller | |
| 2,285,345 A | 6/1942 | Miller | |
| 2,355,679 A | 8/1944 | Roxs et al. | |
| 2,374,266 A | 4/1945 | Barr | |
| 2,374,309 A | 4/1945 | Roxs | |
| 2,676,509 A | 4/1954 | Graham | |
| 2,736,227 A | 2/1956 | Stroble | |
| 2,789,458 A | 4/1957 | Skeisvoll | |
| 3,343,440 A | 9/1967 | Jones et al. | |
| 3,431,623 A | 3/1969 | Smeets | |
| 4,048,897 A | 9/1977 | Price, Jr. | |
| 4,274,323 A | * 6/1981 | Resnicow | ................... 411/433 |
| 4,462,731 A | * 7/1984 | Rovinsky et al. | ........... 411/433 |
| 4,556,352 A | * 12/1985 | Resnicow | ................... 411/433 |
| 4,826,376 A | 5/1989 | Aldridge et al. | |
| 5,779,418 A | * 7/1998 | Ying-Che | ................... 411/433 |

FOREIGN PATENT DOCUMENTS

| | | | |
|---|---|---|---|
| DE | 1119061 | * 12/1961 | ................... 411/433 |
| GB | 524399 | * 8/1940 | ................... 411/433 |

* cited by examiner

Primary Examiner—Neill Wilson

(57) ABSTRACT

A split nut having movable pieces that can be disengaged to expose an interior space of the thread so that the nut can be mounted on, and secured to, a threaded rod, without threading the split nut over an end of the threaded rod.

16 Claims, 3 Drawing Sheets

HINGED SPLIT NUT

BACKGROUND OF THE INVENTION

1. Field of the Invention

The present invention relates generally to a split nut and more particularly, relates to a split nut that can be attached to a threaded rod or bolt at its mid-section, without the need to thread the nut over an end of the threaded rod.

2. Background of the Invention

Split nuts are used to hold and secure objects or articles in place at various positions on threaded rods, spindles, and bolts. Conventional nuts are one piece and require a user to thread them over the end of a threaded rod, spindle or bolt in order to position them in place. Split nuts are available in those instances where a nut needs to be replaced on a threaded rod, or items must be added to or removed from the threaded rod, and it is undesirable to thread the nut over an end of the rod. An example of a nut designed to perform such a function is shown in U.S. Pat. No. 4,826,376 granted May 2, 1987 for a Lock Nut and Method for Making Same.

Although these prior art split nuts function generally as intended, they do have drawbacks in ease of use and reliable fastening and threading once on the threaded rod. The present invention overcomes these drawbacks and provides an improved split nut.

SUMMARY OF THE INVENTION

The present invention includes a first semi-annular member, a second semi-annular member and a third semi-annular member wherein said first, second and third members are connected for hinged rotation with respect to one another. The first semi-annular member has a first end and a second end with a notch located near its second end. A second semi-annular member has a first end, a second end with a notch located near the second end, and an internal threaded portion. The third semi-annular member is positioned between the first and second semi-annular members and has a first end, a second end, and an internal threaded portion wherein the threaded portion extends beyond an upper or lower surface of the second semi-annular member. The height of the outer most portions of the first and third semi-annular members, taken together, may equal the outermost height of the second semi-annular member.

In one embodiment, the notch in the first member is coupled with the notch in the second member, to hold the first, second and third members in a closed position. In addition, the end of the third semi-annular member, located opposite the opening in the second semi-annular member, fits beneath the notch in the second semi-annular member when the split nut is in a closed position.

An aspect of the invention includes an inner circumference of the split nut of the present invention with two opposing threaded portions extending along an entire interior height of the nut.

Another aspect of the present invention includes an inner circumferential portion of the first semi-annular member that fits about an outer circumferential portion of the third semi-annular member when the split nut is in a closed position.

In another embodiment of the present invention, openings are contained within at least one end of the first, second, and third semi-annular members such that the openings extend through the members and can be aligned when the third semi-annular member is located between the first and second semi-annular members. A pin member is inserted through the openings contained in the first, second and third semi-annular members to hold the first, second and third members together.

BRIEF DESCRIPTION OF THE DRAWINGS

The figures in this document illustrate various exemplary embodiments of the present invention. Embodiments of the present invention may include part or all of the features shown in one of these drawings, or may include features from two or more figures. Embodiments of the present invention may also include features described in the specification, or limitations to features described in the specification. Furthermore, embodiments of the present invention may include features that would be familiar to a person of ordinary skill in the art having studied this document.

The split nut of the present invention will hereinafter be described in conjunction with the appended drawing figures, wherein like numerals denote like elements, and.

DETAILED DESCRIPTION OF THE PREFERRED EMBODIMENTS

Figure 1:
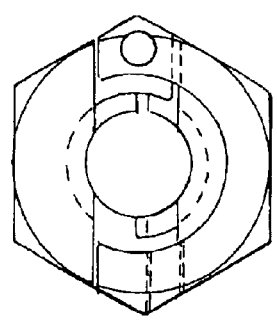
FIG. 1 is a top plan view of one exemplary embodiment of the split nut of the present invention, the split nut being in a closed position.

In general, various embodiments of the present invention include split nuts having movable pieces where the split nuts can be mounted on a threaded member, such as a threaded rod, without having to thread the nut over at least one end of the threaded rod.

FIGS. 1–9 illustrate a first exemplary embodiment of the split nut of the present invention. Briefly, this first embodiment of the split nut 10 includes a first semi-annular member 12, a second semi-annular member 16, and a third semi-annular member 14 (see FIG. 2) wherein at least one end of each of these members are all hinged to one another such that they are capable of rotating with respect to one another. A pin 18 such as that shown in FIG. 1, may be used to connect at least one end of the first, second, and third semi-annular members 12, 14 and 16 so that they are rotatable with respect to one another. Other means for connecting the first, second, and third semi-annular members 12, 14 and 16 to one another so that they are capable of rotation with respect to one another may also include a more traditional hinge type mechanism or other similarly functioning mechanism, and the like.

Each of the first member 12, second member 16, and third member 14, has a generally semi-annular shape, meaning that each of the members has a generally half ring shape. However, each of the first, second, and third semi-annular members 12, 16 and 14 also have various notches, extensions, and openings contained therein as will be described hereinafter.

Figure 2:
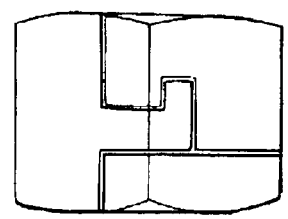
FIG. 2 is a front view of the exemplary embodiment of the split nut shown in FIG. 1.
Figure 3:
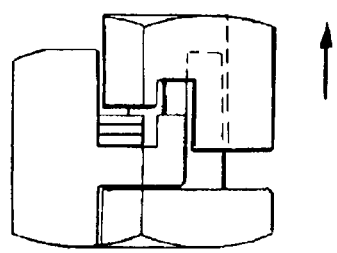
FIG. 3 is the exemplary embodiment of the split nut shown in FIGS. 1–2 with the first semi-annular member of the split nut being raised to disengage the pieces of the split nut.
Figure 4:
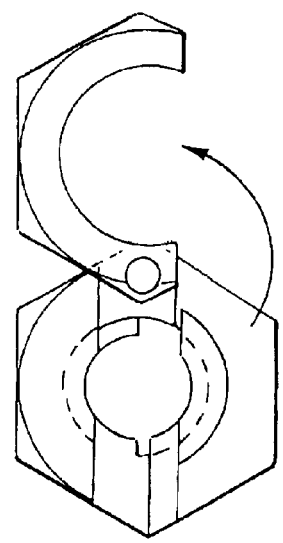
FIG. 4 is a top plan view of an embodiment of the split nut shown in FIGS. 1–3 with the first semi-annular member of the split nut shown rotated with respect to, and away from, the second and third semi-annular members of the split nut.
Figure 5:
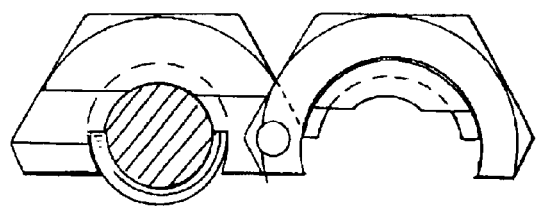
FIG. 5 is a cross-sectional top view of the exemplary embodiment of the split nut shown in FIGS. 1–4 positioned about a threaded rod which shows the first and second semi-annular members disengaged from the third semi-annular member and the threaded bolt.

FIG. 2 shows split nut 10 in a closed position. FIGS. 3–4 show the directions in which the first semi-annular member 12 must be moved in order to open split nut 10. As can be seen in FIGS. 3–4, first semi-annular member 12 includes a first end 20 and a second end 22. Second end 22 of the first semi-annular member 12 contains a notch 24. In order to open split nut 10, first semi-annular member 12 must be moved in an upward and vertical direction 26 away from second and third semi-annular members 14 and 16 as shown in FIG. 3. Next, as shown in FIG. 4, first semi-annular member 12 is rotated away from second and third semi-annular members 14 and 16 in the direction shown by arrow 28. Finally, third semi-annular member 14 is rotated away from second semi-annular member 16 or, second semi-annular member 16 is rotated away from third semi-annular member 14, to completely open split nut 10 so that it can be mounted on a threaded rod or threaded bolt. A top cross-sectional view of split nut 10 being removed from a threaded member 30 is shown in FIG. 5. In FIG. 5, first semi-annular member 12 has already been rotated away from second semi-annular member 16 and third semi-annular member 14 has been rotated away from second semi-annular member 16 to expose threaded rod 30.

Figure 6:
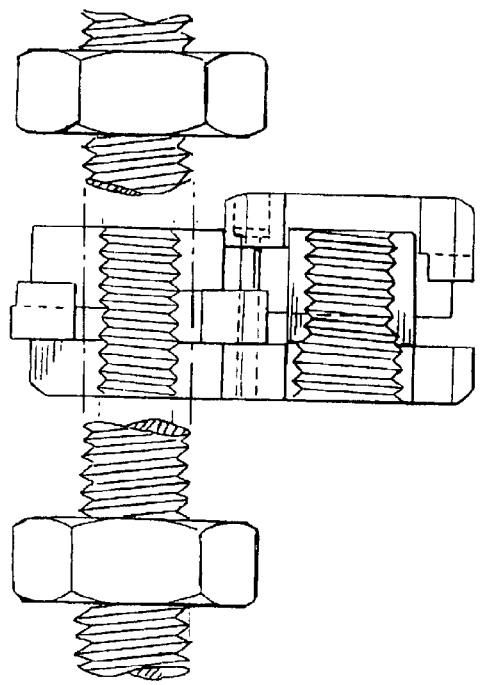
FIG. 6 is an exploded view of the exemplary embodiment of the split nut shown in FIGS. 1–5 shown in an open position for mounting the split nut about a threaded rod.
Figure 8:
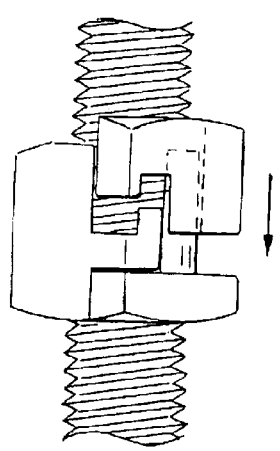
FIG. 8 is a front view of the exemplary embodiment of the split nut shown in FIGS. 1–7 with an arrow showing the second direction of movement for the first semi-annular member to achieve a closed and locked position.

The components of third semi-annular member 14 and second semi-annular member 16 are more clearly shown with respect to FIGS. 6 and 8. As shown in FIG. 6, third semi-annular member 14 includes a first end 32, a second end 34, an internal threaded portion 36, an upper surface 38, and a lower surface 40. In FIG. 6, internal threaded portion 36 extends beyond upper surface 38 of third semi-annular member 14 to create an area of third semi-annular member 14 having the greatest height of third semi-annular member 14. The internal threaded portion 36 that extends beyond upper surface 38 is shorter in length than that portion that does not extend beyond the upper surface 38. It will be understood by those skilled in the art that internal threaded portion 36 of third semi-annular member 14 may also extend from lower surface 40 of third semi-annular member 14 if first semi-annular member 12 is located on a side opposite of the third semi-annular member 14 as shown in FIG. 6.

First semi-annular member 12 and third semi-annular member 14 are shown positioned adjacent to one another in FIG. 6. This is also the position that first and third annular members 12 and 14 are in when the split nut 10 in a closed position. As can be seen in FIG. 6, an inner portion 41 of the first semi-annular member 12 fits about the threaded portion 36 of the third semi-annular member 14 that extends beyond the upper surface 38 of the second semi-annular member. When split nut 10 is in a closed position, the inner circumference of the split nut 10 includes at least two opposing threaded portions 36 and 48 extending along an entire height of the nut 10.

Figure 7:
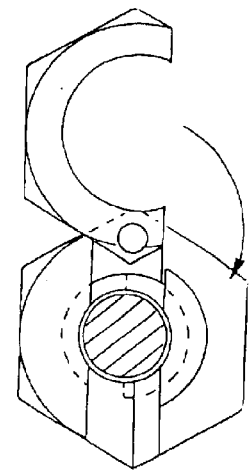
FIG. 7 is a top plan view of the exemplary embodiment of the split nut shown in FIGS. 1–6 with an arrow showing a first direction of movement for the first semi-annular member to achieve a closed position.

Second semi-annular member 16, a portion of which is secured between first semi-annular member 12 and third semi-annular member 14, includes a first end 42, a second end 44 with a notch 46 contained near second end 44 of second semi-annular member 16, an internal threaded portion 48, and generally trapezoidal shaped portions 50 (the shape of which is better shown in FIGS. 5 and 7). An internal threaded portion 52, extends from a top surface 54 to a bottom surface of second semi-annular member 16.

FIG. 6 shows split nut 10 in an open position where first semi-annular member 12 and third semi-annular member 14 are rotated away from second semi-annular member 16 so that the first, second, and third semi-annular members 12, 16 and 14 can be positioned and secured about threaded rod 30. A first standard nut 58 and a second standard nut 59 are shown positioned on threaded member 30. As shown in FIG. 6, split nut 10 of the present invention can be secured and locked about threaded rod 30 between first standard nut 58 and second standard nut 59 without removing either of first and second standard nuts 58 and 59 from threaded member 30.

A top cross-sectional view of split nut 10 shown in FIG. 6 after rotating third semi-annular member 14 toward and against second semi-annular member 16 is shown in FIG. 7. To complete securing and locking split nut 10 around threaded rod 30, first semi-annular member 12 is rotated with respect to second and third semi-annular members 16 and 14 in the direction shown by arrow 60. Finally, as shown in FIG. 8, notch 24 in first semi-annular member 12 is coupled with notch 46 in second semi-annular member 16 by moving first semi-annular member 12 in a downward, vertical direction as shown by arrow 62 to lock the first, second, and third semi-annular members 12, 16 and 14 of split nut 10 in place about the threaded rod 30.

Figure 9:
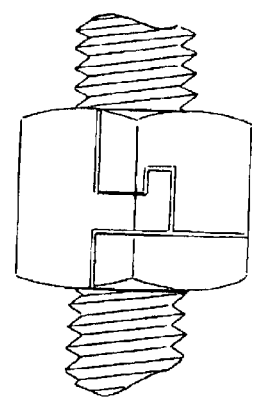
FIG. 9 is a front view of the exemplary embodiment of the split nut shown in FIGS. 1–8 with the split nut shown in the closed and locked position after mounting it on a threaded rod.

FIG. 9 shows a front view of split nut 10 in a closed and locked position surrounding rod member 30. As shown in FIG. 9, an end 63 of the third semi-annular member 14, which is located opposite the opening contained in the third semi-annular member 14, fits beneath the notch 46 of the second semi-annular member 16 when the split nut is in a closed position.

Figure 10:
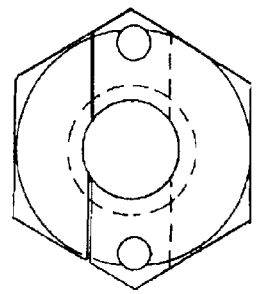
FIG. 10 is a top plan view of a second embodiment of the split nut of the present invention, the split nut being illustrated in its closed position.
Figure 11:
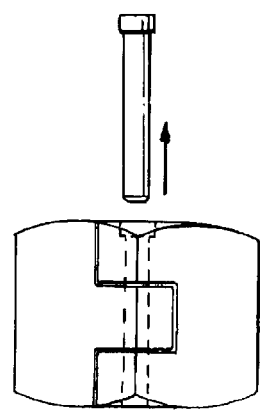
FIG. 11 is a front view of the split nut shown in FIG. 10 with a pin member shown being removed.

A second exemplary embodiment of split nut 70 in accordance with the present invention is illustrated in FIGS. 10–14. FIG. 10 is a top plan view of the split nut 70 in its closed position. Split member 72, a second semi-annular member 74, a first pin member 76 and a second pin member 78. As shown in FIG. 10 and FIG. 11, first semi-annular member 72 includes a first end 80 having a notch 82, a second end 84 having a notch (not shown) like the notch 82 in first end 80, an internal threaded portion 88 (see FIG. 13), and openings 90 (see FIG. 12) contained in the first and second ends 80 and 84 which traverse the notches located at those ends.

As further shown in FIGS. 10 and 11, second semi-annular member 74 includes a first end 92 having a protrusion 94, a second end 96 having a protrusion (not shown) like the protrusion 94 in first end 92, an internal threaded portion 100 (see FIG. 13), and at least one opening 102 (see FIG. 12) contained in the first end 92 or second end 96 of second semi-annular member 74 that traverses the protrusion located at that end of the second semi-annular member 74. The opposite end of second semi-annular member 74 may also contain an opening but may alternatively contain a bar or pin member extending from both sides of the protrusion located in this opposite end which functions in the place of first pin member 76. The ends of the pin member extending from the protrusion may be inserted through openings 90 contained in the first and second ends 80 and 84 of first semi-annular member 72 so that first and second semi-annular members 72 and 74 can be rotated with respect to one another in order to move split nut 70 in open and closed positions.

As previously stated, FIG. 10 is a top plan view of split nut 70 shown in its closed position. Protrusions located at the first and second ends 92 and 96 of second semi-annular member 74 fit within the notches located at first and second ends 80 and 84 of first semi-annular member 72. A first pin member 76 inserted through openings in the second end 84 of first semi-annular member 72 and in an opening contained in the protrusion at the second end 96 of the second semi-annular opening 74 and attached thereto acts as a hinge for the two annular members 72, 74. A second pin member 78 is inserted through openings 90 in the first end 80 of first semi-annular member 72 and in an opening 102 contained in protrusion 94 located at the first end 92 of the second semi-annular opening 74 acts as a latch to keep the two annular members locked together.

Figure 14:
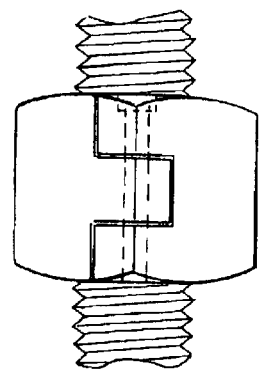
FIG. 14 is a front view of the second embodiment of the split nut shown in FIGS. 10–13 with the split nut shown in a closed position around a threaded bolt.

Split nut 70 is shown in its closed position surrounding a threaded rod 104, such as a bolt or screw, in FIG. 14. FIG. 13 is a cross-sectional side view of the split nut shown in FIGS. 10–12 which shows that an internal threaded portion 88 of first semi-annular member 72 forms a contiguous threaded portion with internal threaded portion 100 of second semi-annular member 74 when split nut 70 is in its closed position so that the contiguous threaded portion can be threaded about a threaded rod 104.

Figure 12:
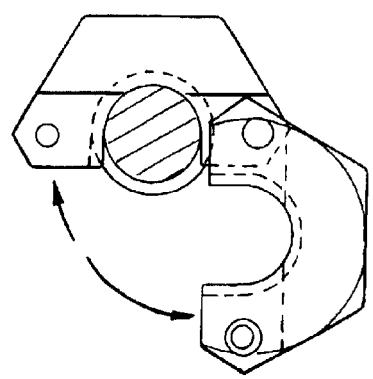
FIG. 12 is a cross-sectional top view of the split nut shown in FIGS. 10–11 positioned about a threaded bolt, with arrows showing the movement of the first and second semi-annular members to open the split nut from a closed position.
Figure 13:
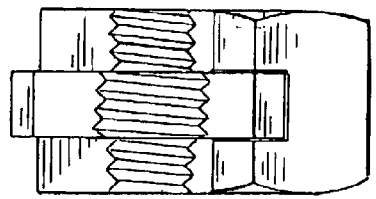
FIG. 13 is a cross-sectional side view of the split nut shown in FIGS. 10–12.

FIGS. 11–12 show how split nut 70 is opened from its closed position (as shown in FIG. 10) so that it can be mounted on, or removed from, a threaded rod 104 as shown in FIG. 14. As shown in FIG. 11, second pin member 78 is removed from the openings contained in first ends 80 and 92 of first and second semi-annular members 72 and 74, respectively. Then, as shown in FIG. 12, first end 80 of first semi-annular member 72 is rotated away from first end 92 of second semi-annular member 74 so that internal threaded portions 88 and 100 of first and second semi-annular members 72 and 74, respectively, are exposed. First pin member 76 is preferably secured but may also be removed if it has not been secured to second-semi-annular member 74.

It will be understood that the foregoing description is of preferred exemplary embodiments of the invention and that the invention is not limited to the specific forms shown or described herein. Various modifications may be made in the components of the present invention, such as the exact shapes and sizes of the semi-annular members and their components, without departing from the scope of the invention as expressed in the appended claims.

What is claimed is:

1. A split nut comprising:
   a) a first semi-annular member;
   b) a second semi-annular member having an internal threaded portion;
   c) a third semi-annular member having an internal threaded portion, said third semi-annular member being positioned between said first and second semi-annular members; and
   a hinge connecting the first, second and third semi-annular members together
   wherein said first, second, and third semi-annular members are capable of rotating about a common axis.

2. The split nut of claim 1, wherein the first and second semi-annular members have a notch, the notches being capable of coupling with one another such that the first, second, and third semi-annular members can be secured to one another in a closed position forming an annular member.

3. The split nut of claim 1, wherein the hinge connecting all first, second, and third semi-annular members is a pin member.

4. The split nut of claim 3, wherein said pin member is welded to one of said first or second semi-annular members.

5. The split nut of claim 4, wherein the first or second semi-annular member is capable of lateral movement along the length of the pin member.

6. The split nut of claim 1, wherein the internal threaded portion of the third semi-annular member extends beyond an upper or lower surface of the third semi-annular member.

7. The split nut of claim 1, wherein a height of both said first and third semi-annular members equals a height of said second semi-annular member.

8. The split nut of claim 1 wherein an inner circumference of the split nut comprises at least two opposing threaded portions extending along an entire height of the split nut when said first, second, and third semi-annular members are in a closed position which forms an annular member.

9. A split nut comprising:
   a) a first semi-annular member having an opening therethrough near one end and a notch therein at an opposite end;
   b) a third semi-annular member having an opening therethrough near one end and an internal threaded portion wherein said threaded portion extends beyond an upper or lower surface of said second member;
   c) a second semi-annular member having an opening therethrough near one end, a notch therein at an opposite end, and an internal threaded portion; and
   d) a pin member inserted through the opening as contained in said first, second, and third members.

10. The split nut of claim 9 wherein outermost heights of said first and third members added together equal a height of the second member.

11. The split nut of claim 9 wherein the notch in the first member is coupled with the notch in the second member to hold the first, second and third members in a closed position.

12. The split nut of claim 11 wherein an inner circumference of the split nut comprises at least two opposing threaded portions extending along an entire height of the split nut.

13. The split nut of claim 9 wherein the internal threaded portion extending beyond the upper or lower surface of said third member is shorter in length than said threaded portion not extending beyond the upper or lower surface.

14. The split nut of claim 9 wherein an inner portion of said first member fits about the threaded portion of the third member extending beyond the upper or lower surface of the third member when the split nut is in a closed position.

15. The split nut of claim 9 wherein an end of said third member located opposite the opening in said third member fits beneath the notch in the second member when the split nut is in a closed position.

16. The split nut of claim 9 wherein said pin member is welded to one of said first or second members.

\* \* \* \* \*